(12) United States Patent
Kobayashi (10) Patent No.: US 11,947,074 B2
(45) Date of Patent: Apr. 2, 2024

(54) OPTICAL SYSTEM AND IMAGE PICKUP APPARATUS

(71) Applicant: CANON KABUSHIKI KAISHA, Tokyo (JP)

(72) Inventor: Mikio Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 160 days.

(21) Appl. No.: 17/552,802

(22) Filed: Dec. 16, 2021

(65) Prior Publication Data

US 2022/0221690 A1 Jul. 14, 2022

(30) Foreign Application Priority Data

Jan. 13, 2021 (JP) ................. 2021-003688

(51) Int. Cl.
*G02B 13/00* (2006.01)
*G02B 3/04* (2006.01)
*G02B 9/10* (2006.01)

(52) U.S. Cl.
CPC ............ *G02B 13/003* (2013.01); *G02B 3/04* (2013.01); *G02B 9/10* (2013.01)

(58) Field of Classification Search
CPC .......... G02B 13/003; G02B 3/04; G02B 9/10; G02B 13/004; G02B 13/006; G02B 13/0085
See application file for complete search history.

(56) References Cited

U.S. PATENT DOCUMENTS

| 9,798,115 B1 | 10/2017 | Yin et al. |
| 10,890,698 B2 | 1/2021 | Kobayashi |
| 2020/0064600 A1* | 2/2020 | Igarashi ............... H04N 25/611 |

FOREIGN PATENT DOCUMENTS

| EP | 2113801 A1 * | 11/2009 | ............ B82Y 20/00 |
| WO | 2018/220937 A1 | 12/2018 | |

* cited by examiner

*Primary Examiner* — Alicia M Harrington (74) *Attorney, Agent, or Firm* — Carter, DeLuca & Farrell LLP (57) ABSTRACT

An optical system includes, in order from an object side to an image side, a first unit and a second unit. The first unit includes a first substrate, and a first lens having a negative refractive power and disposed on the image side of the first substrate. The second unit includes a second substrate, and a second lens having a positive refractive power and disposed on the image side of the second substrate. An absolute value of the refractive power on an optical axis of the second lens is larger than that of the first lens. A surface on the image side of the first lens is an aspheric surface. In the aspheric surface of the first lens, a refractive power at an outermost peripheral portion of an effective area is smaller than a refractive power on the optical axis.

17 Claims, 7 Drawing Sheets

OPTICAL SYSTEM AND IMAGE PICKUP APPARATUS

BACKGROUND OF THE INVENTION

Field of the Invention

The present invention relates to an optical system and an image pickup apparatus.

Description of the Related Art

A technology called wafer level optics has conventionally been known as a method for manufacturing a small optical system at low cost. U.S. Pat. No. 9,798,115 discloses an optical system including three lens surfaces manufactured by the wafer level optics. PCT International Publication No. 2018/220937 discloses an optical system including two lens surfaces.

The optical system disclosed in U.S. Pat. No. 9,798,115 includes three lens surfaces, and thus needs many manufacturing steps and high manufacturing cost. The optical system disclosed in PCT International Publication No. 2018/220937 has such a long overall length that the miniaturization is difficult. In addition, the manufacturing process of the optical system in PCT International Publication No. 2018/220937 includes a step that does not use the wafer process, the optical system cannot be manufactured at low cost. Moreover, as a small optical system for an endoscope or a mobile phone, a wide-angle optical system having high optical performance is demanded.

SUMMARY OF THE INVENTION

The present invention provides a small, inexpensive, wide-angle optical system having high optical performance and an image pickup apparatus having the same.

An optical system according to one aspect of the present invention includes, in order from an object side to an image side, a first unit and a second unit. The first unit includes a first substrate, and a first lens having a negative refractive power and disposed on the image side of the first substrate. The second unit includes a second substrate, and a second lens having a positive refractive power and disposed on the image side of the second substrate. An absolute value of the refractive power on an optical axis of the second lens is larger than that of the first lens. A surface on the image side of the first lens is an aspheric surface. In the aspheric surface of the first lens, a refractive power at an outermost peripheral portion of an effective area is smaller than a refractive power on the optical axis.

An image pickup apparatus including the above optical system, and an image sensor configured to receive an image formed by the optical system also constitutes another aspect of the present invention.

Further features of the present invention will become apparent from the following description of exemplary embodiments with reference to the attached drawings.

BRIEF DESCRIPTION OF THE DRAWINGS

FIG. 15 is a schematic view of principal part of an electronic apparatus according to Example 8.
FIG. 16 is a schematic view of principal part of an image pickup apparatus according to Example 9.

DESCRIPTION OF THE EMBODIMENTS

Referring now to the accompanying drawings, a detailed description will be given of embodiments according to the present invention.

The optical system according to each example is a small optical system obtained by using the technology called the wafer level optics. Such an optical system is called a wafer level lens, and an image pickup apparatus using the wafer level lens for an imaging optical system is called a wafer level camera. The optical system according to each example is suitable for an optical system for a built-in camera of an electronic apparatus such as a mobile phone, a smartphone, or a wearable terminal, or as an objective optical system for an endoscope because of its small size and low cost.

FIGS. 1, 3, 5, 7, 9, 11, and 13 are sectional views of optical systems 1a to 1g according to Examples 1 to 7, respectively. In each sectional view, a left side is an object side (front) and a right side is an image side (rear). SP denotes a diaphragm (aperture stop), and IP denotes an image plane. Disposed on the image plane IP is an imaging surface of a solid-state image sensor such as a CCD sensor or a CMOS sensor in an image pickup device, or a photosensitive surface corresponding to a film surface of a film-based camera.

FIGS. 2, 4, 6, 8, 10, 12, and 14 are aberration diagrams of the optical systems 1a to 1g according to Examples 1 to 7, respectively. In a spherical aberration diagram, Fno denotes an F-number, and the spherical aberration diagram illustrates a spherical aberration amount for the d-line (wavelength 587.6 nm), the g-line (wavelength 435.8 nm), the C-line (wavelength 656.3 nm), and the F-line (wavelength 486.1 mm). In an astigmatism diagram, $\Delta S$ denotes an astigmatism amount on a sagittal image plane (solid line), and $\Delta M$ denotes an astigmatism amount on a meridional image plane (broken line). A distortion diagram illustrates a distortion amount for the d-line. A lateral chromatic aberration diagram illustrates a chromatic aberration amount for the g-line. Y denotes an image height (maximum image height).

The optical system according to each example includes, in order from the object side to the image side, a first unit L1 and a second unit L2. The first unit L1 includes a first substrate L11, and a first lens L12 having a negative refractive power and disposed on the image side of the first substrate L11. The second unit L2 includes a second substrate L21, and a second lens L22 having a positive refractive power and disposed on the image side of the second substrate L21. A diaphragm SP is disposed on the image side of the first unit L1. An absolute value of the refractive power on the optical axis OA of the second lens L22 is larger than an absolute value of the refractive power on the optical axis of the first lens L12. A surface on the image side of the first lens L12 is an aspherical surface S1. In the aspherical surface S1 of the first lens L12, a refractive power of a peripheral portion (the outermost peripheral portion S1$e$ of an effective diameter) is smaller than a refractive power of the central portion (on the optical axis). The effective diameter (effective area) here means a diameter (area) through which effective light rays that contribute to imaging pass on the optical surface.

The optical system according to each example includes a cover glass 50 disposed on the image side of the second unit L2. The cover glass 50 is disposed to protect the image sensor and the second lens L22.

The first substrate L11 is a flat substrate, and the first lens L12 is a plano-concave lens. The first lens L12 is disposed in close contact with the first substrate L11. The second substrate L21 is a flat substrate, and the second lens L22 is a plano-convex lens. The second lens L22 is disposed in close contact with the second substrate L21.

In each example, the first unit L1 and the second unit L2 are manufactured by the wafer level process in order to realize a compact and inexpensive optical system. That is, each of the first unit L1 and the second unit L2 is manufactured by forming a lens layer made of a curable resin material on a wafer (flat substrate) made of a glass material. In the second unit L2, the diaphragm SP is formed on the object side of the second substrate L21 by the same wafer process. Many wafer level lenses can be manufactured by arranging the first unit L1 and second unit L2 manufactured by the wafer level process, the cover glass 50, and the image sensor at predetermined intervals, by bonding them outside of the effective diameter, and by cutting them.

The material forming the lens layer may be a thermoplastic resin or an ultraviolet curable resin as long as it is a curable resin material. Examples include acrylic resins, silicone resins, and cycloolefin polymers. In each example, each of the first substrate L11 and the second substrate L21 is made of glass, and each of the first lens L12 and the second lens L22 is made of resin, but the present invention is not limited to this embodiment. If the refractive indexes of the first substrate L11 and the first lens L12 are different from each other, for example, both of the first substrate L11 and the first lens L12 may be formed of resin. This is similarly applicable to the second unit L2.

The diaphragm SP can be formed on the second substrate L21, for example, by vapor-depositing a light-shielding film such as chromium using a mask, or by forming an opening through etching after the vapor deposition.

In each example, the cover glass 50 is an integral glass substrate, but the present invention is not limited to this example. For example, the cover glass may be divided into two, one of them may be bonded to the second lens L22 in the peripheral portion through the wafer process to form a wafer lens unit, the other of them may be used as a cover glass for the image sensor to manufacture a sensor unit, and then the wafer lens unit and the sensor unit may be adhered to each other on a flat surface.

Each example may satisfy the following inequality (1):

$$1.10 < |P2/P1| < 8.00 \tag{1}$$

where P1 is a refractive power at the central portion of the first lens L12, and P2 is a refractive power at the central portion of the second lens is P2.

The refractive power P of each lens is expressed by $P = \Delta N/R$, where $\Delta N$ is a refractive index difference between the surface on the object side and the surface on the image side of each lens and R is a radius of curvature of each lens on the optical axis.

If the value is lower than the lower limit in the inequality (1), the refractive power of the first lens L12 becomes large, a distance between the first lens L1 and the diaphragm SP becomes long, and the effective diameter of the surface closest to the object becomes large. On the other hand, if the value is higher than the upper limit in the inequality (1), the refractive power of the second lens L22 becomes large, various aberrations such as a curvature of field increase, a curvature of the lens increases, and the manufacture becomes difficult.

The numerical range of the inequality (1) may be set to a numerical range in the following inequality (1a).

$$1.15 < |P2/P1| < 7.00 \tag{1a}$$

The numerical range of the inequality (1) may be set to a numerical range in the following inequality (1b).

$$1.20 < |P2/P1| < 6.00 \tag{1b}$$

Each example may satisfy the following inequality (2):

$$1.50 < |rp1| < 20.00 \tag{2}$$

where rp1 is a refractive power ratio of the central portion to the peripheral portion of the first lens.

The refractive power ratio rp1 of the central portion to the peripheral portion of the first lens L12 is calculated by the following expression (3).

$$rp1 = R1e/R1 \tag{3}$$

In the expression (3), R1 is a radius of curvature of the central portion of the aspherical surface S1 on the image side of the first lens L12, and R1$e$ is a radius of curvature of the peripheral portion of the aspherical surface S1 on the image side of the first lens L12.

A shape of the aspherical surface x(h) in each example is expressed by the following expression (a):

$$x(h) = \frac{\left(\frac{h^2}{r}\right)}{1 + \sqrt{\left\{1 - (1+k)\left(\frac{h}{r}\right)^2\right\}}} + A_4 h^4 + A_6 h^6 + A_8 h^8 + A_{10} h^{10} + \ldots \tag{a}$$

where x as a displacement amount from a surface apex in the optical axis direction, h is a height from the optical axis in a direction orthogonal to the optical axis, r is a paraxial radius of curvature, k is a conical constant, and Ai (i=4, 6, 8 . . . ) is an aspherical coefficient of each order.

A slope of the aspherical shape at the height h in the optical axis direction can be calculated from the differential of the expression (a). The differential of the expression (a) is represented by the following expression (b).

$$x'(h) = \frac{\partial}{\partial h}[x(h)] = \frac{rh\sqrt{1 - \frac{(1+k)h^2}{r^2}}}{r^2 - (1+k)h^2} + 4 \times A_4 h^3 + 6 \times A_6 h^5 + 8 \times A_8 h^7 + 10 \times A_{10} h^9 + \ldots \quad (b)$$

A local radius of curvature Re at the height h in the optical axis direction can be obtained from the following expression (c), where the conical coefficient k of the expression (b) and the aspherical coefficient Ai of each order are set to 0.

$$x'(h) = \frac{r_e h \sqrt{1 - \frac{h^2}{r_e^2}}}{r_e^2 - h^2} \quad (c)$$

If it the value is lower than the lower limit in the inequality (2), the aspherical effect of the first lens L12 becomes small, and it becomes difficult to suppress various aberrations (curvature of field and distortion) in the off-axis light. On the other hand, if the value is higher than the upper limit in the inequality (2), the refractive power at the central portion of the first lens L12 becomes stronger, the effective diameter of the surface closest to the object becomes larger, and the optical system becomes larger.

The numerical range of the inequality (2) may be set to a numerical range in the following inequality (2a).

$$1.70 < |rp1| < 15.00 \quad (2a)$$

The numerical range of the inequality (2) may be set to a numerical range in the following inequality (2b).

$$1.90 < |rp1| < 12.00 \quad (2b)$$

Each example can more satisfactorily correct the aberration by making a refractive power of the peripheral portion (the outermost peripheral portion S2e of an effective diameter) in an aspherical surface S2 that is an surface on the image side of the second lens L22 smaller than a refractive power of the central portion in the aspherical surface S2 of the second lens L22.

More specifically, the following inequality (4) may be satisfied:

$$1.25 < |rp2| < 10.00 \quad (4)$$

where rp2 is a refractive power ratio of the central portion to the peripheral portion of the second lens L22.

The refractive power ratio rp2 of the central portion to the peripheral portion of the second lens L22 is calculated by the following expression (5).

$$rp2 = R2e/R2 \quad (5)$$

In the expression (5), R2 is a radius of curvature of the central portion in the aspherical surface on the image side of the second lens L22, and R2e is a radius of curvature of the peripheral portion in the aspherical surface on the image side of the second lens L22 and is calculated similar to the expressions (a), (b), and (c).

The numerical range of the inequality (4) may be set to a numerical range in the following inequality (4a).

$$1.30 < |rp2| < 5.00 \quad (4a)$$

The numerical range of the inequality (4) may be set to a numerical range in the following inequality (4b).

$$1.30 < |rp2| < 3.00 \quad (4b)$$

In the optical system according to each example, lens surfaces are disposed before and after the diaphragm SP, and a refractive power of each lens surface is properly set to realize the miniaturization and suppression of various aberrations. Therefore, the second unit L2 may include the diaphragm SP. The diaphragm SP may be disposed close to the second substrate L21 (for example, disposed on the second substrate L21). By disposing the diaphragm SP close to the second substrate L21 of the second unit L2, the diaphragm SP can be formed in the wafer process and the structure is easy to manufacture. The diaphragm SP may be located on either the surface on the object side of the second substrate L21 opposite to an air surface or the surface on the image side of the second substrate L21 facing the second lens L22. Each configuration promotes easy manufacturing.

Each example may satisfy the following inequality (5):

$$1.00 < R1e/d1 < 30.00 \quad (5)$$

where R1e is a radius of curvature of the peripheral portion of the first lens L12, and d1 is a distance on the optical axis from the surface on the image side of the first lens L12 to the diaphragm SP.

If the value is lower than the lower limit in the inequality (5), the refractive power of the peripheral portion of the first lens L12 becomes large (close to the refractive power of the central portion), the aspherical effect becomes weak, and it becomes difficult to suppress various aberrations such as a curvature of field. On the other hand, if the value is higher than the upper limit in the inequality (5), a distance between the diaphragm SP and the first lens L12 becomes small, and the spherical aberration of the on-axis luminous flux and the aberration of the off-axis luminous flux become unbalanced, and it becomes difficult to suppress various aberrations.

The numerical range of the inequality (5) may be set to a numerical range in the following inequality (5a).

$$1.10 < R1e/d1 < 25.00 \quad (5a)$$

The numerical range of the inequality (5) may be set to a numerical range in the following inequality (5b).

$$1.30 < R1e/d1 < 22.00 \quad (5b)$$

Each example may satisfy the following inequality (6):

$$0.53 < d0/R1 < 5.00 \quad (6)$$

where d0 is a distance on the optical axis from the surface on the object side of the first unit L1 to the diaphragm SP, and R1 is a radius of curvature of the central portion in the surface on the image side of the first lens L12.

If the value is lower than the lower limit in the inequality (6), the refractive power of the first lens L12 becomes stronger or a distance to the diaphragm SP becomes smaller, and it becomes difficult to suppress various aberrations. On the other hand, if the value is higher than the upper limit in the inequality (6), the effective diameter of the surface closest to the object becomes large, and the optical system becomes large.

The numerical range of the inequality (6) is set to a numerical range in the following inequality (6a).

$$0.65 < d0/R1 < 3.00 \quad (6a)$$

The numerical range of the inequality (6) is set to a numerical range in the following inequality (6b).

$$0.70 < d0/R1 < 2.50 \quad (6b)$$

In each example, each of the first lens L12 and the second lens L22 is made of a curable resin, so that the structure can be easily manufactured. In the wafer level optics, wiring is installed by soldering or the like after joining the wafer level lens and the image sensor, a resin may need to withstand a certain high temperature. When the optical system according to each example is used for an imaging optical system, a material having less birefringence may be used. Thus, a resin material having a refractive index of about 1.5 may be selected as the resin material used for the wafer level lens.

Each example may satisfy the following inequality (7):

$$1.40 < N1 < 1.65 \quad (7)$$

where N1 is a refractive index of the first lens L12 for the d-line.

The numerical range of the inequality (7) may be set to a numerical range in the following inequality (7a).

$$1.45 < N1 < 1.63 \quad (7a)$$

Each example may satisfy the following inequality (8):

$$1.40 < N2 < 1.65 \quad (8)$$

where N2 is a refractive index of the second lens L22 for the d-line.

The numerical range of the inequality (8) may be set to a numerical range in the following inequality (8a).

$$1.45 < N2 < 1.63 \quad (8a)$$

If the value is lower than the lower limit in each of the inequalities (7) and (8), a curvature of each lens becomes large, the manufacture becomes difficult, and the curvature of field becomes difficult to correct. On the other hand, if the value is higher than the upper limit in each of the inequalities (7) and (8), the dispersion of the material becomes large, and the chromatic aberration becomes unacceptably increases, and the birefringence becomes large.

The optical system according to each example has such a configuration that aberrations are canceled by the first lens L12 having a negative refractive power and the second lens L22 having a positive refractive power before and after the diaphragm SP. Therefore, by using a low-dispersion material for both the first lens L12 and the second lens L22, longitudinal and lateral chromatic aberrations can be satisfactorily corrected.

Each example may satisfy the following inequality (9):

$$40 < v1 < 80 \quad (9)$$

where v1 is an Abbe number of the first lens L12 based on the d-line.

The numerical range of the inequality (9) may be set to a numerical range in the following inequality (9a).

$$45 < v1 < 70 \quad (9a)$$

Each example may satisfy the following inequality (10):

$$40 < v2 < 80 \quad (10)$$

where v2 is an Abbe number of the second lens L22 based on the d-line.

The numerical range of the inequality (10) may be set to a numerical range in the following inequality (10a).

$$45 < v2 < 70 \quad (10a)$$

If the value is lower than the lower limit in each of the inequalities (9) and (10), it becomes difficult to correct the chromatic aberration. On the other hand, if the value is higher than the upper limit in each of the inequalities (9) and (10), the refractive index becomes low, the curvature of field increases, and the material becomes expensive.

The Abbe numbers v1 and v2 of the first lens L12 and the second lens L22 may be close to each other in terms of a good balance of the chromatic aberration correction. More specifically, each example may satisfy the following inequality (11):

$$0 \leq |v1 - v2| < 15 \quad (11)$$

The Abbe number v based on the d-line is expressed by the following expression:

$$v = (nd - 1)/(nF - nC)$$

where nd, nF, and nC are refractive indexes for the d-line (wavelength 587.6 nm), F-line (wavelength 486.1 nm), and C-line (wavelength 656.3 nm) in the Fraunhofer lines.

A detailed description will be given of the optical system according to each example.

Example 1

Figure 1:
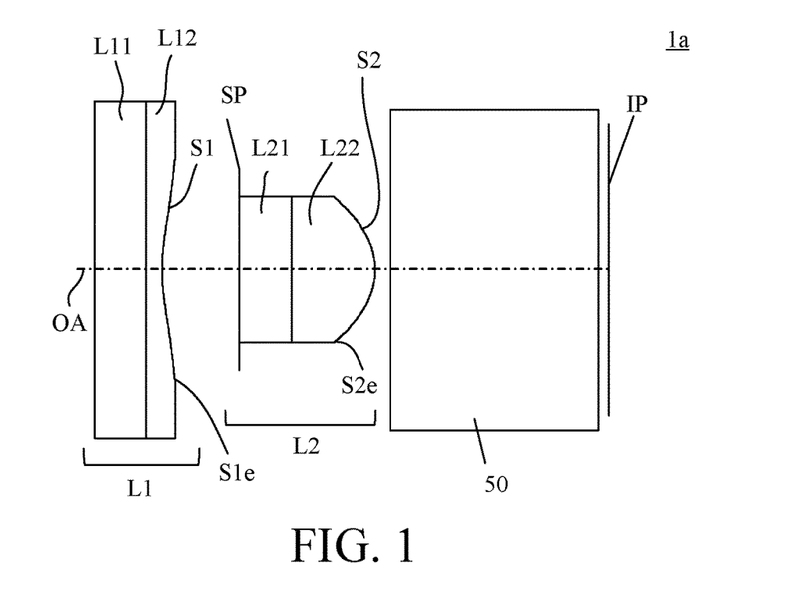
FIG. 1 is a sectional view of an optical system according to Example 1.

Referring now to FIG. 1, a description will be given of an optical system 1a according to Example 1 (numerical example 1). The optical system 1a according to this example includes, in order from the object side to the image side, a first unit L1 and a second unit L2. The first unit L1 includes a first substrate (flat substrate) L11 and a first lens (planar-concave lens) L12 having a negative refractive power and disposed on the image side of the first substrate L11. The second unit L2 includes second substrate (flat substrate) L21, a second lens (planar convex lens) L22 having a positive refractive power and disposed on the image side of the second substrate L21, and a diaphragm SP disposed on the object side of the second substrate L21. The optical system 1a further includes a cover glass 50 disposed on the image side of the second unit L2. The cover glass 50 is disposed to protect an image sensor and the second lens L22.

The optical system 1a according to this example is a compact yet bright and wide-angle optical system having a half angle of view of 59°, an F-number of 2.8, and an image height of 0.28 mm. In miniaturizing a wide-angle optical system having a half angle of view of 50° or more as in this example, it is necessary to shorten the overall length and to control various aberrations while reducing the effective diameter on the surface closest to the object. If the effective diameter of the surface closest to the object becomes large, the size of one optical system becomes large, so that the number of optical systems that can be manufactured from one wafer is reduced and the manufacturing method becomes expensive.

When the wafer level optics is used for a small image pickup apparatus such as an endoscope or a smartphone, a surface closest to the object may be made of a hard material having strong environmental resistance such as a glass material. Since it is difficult to make the surface of the glass material a curved surface in the wafer process, the surface closest to the object may be a glass flat surface.

In this example, an absolute value of the refractive power on the optical axis OA of the second lens L22 is larger than that of the first lens L12. The surface on the image side of the first lens L12 is an aspherical surface S1. In the aspherical surface S1 of the first lens L12, a refractive power of the peripheral portion (the outermost peripheral portion S1e of the effective diameter) is smaller than that of the central portion (on the optical axis). This configuration can realize a wide-angle, bright, and compact optical system with a simple configuration of two lens surfaces. That is, the optical system 1a according to this example can reduce a distance between the diaphragm and the surface closest to the object side while satisfactorily correcting various aberrations of off-axis light having a large incident angle. As a result, the effective diameter of the surface closest to the object side can be made small, and thereby a compact optical system can be realized.

Figure 2:
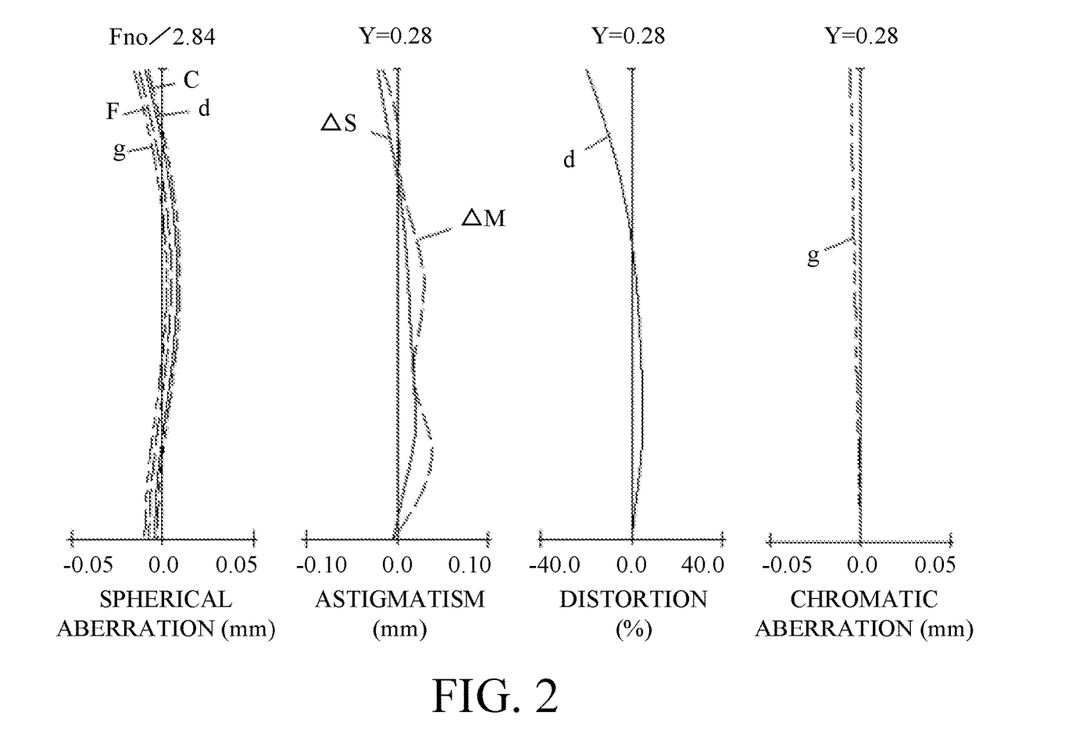
FIG. 2 is an aberration diagram of the optical system according to Example 1.

As illustrated in the aberration diagram of FIG. 2, the optical system 1a according to this example satisfactorily corrects a chromatic aberration and various aberrations up to the periphery of the image even though the optical system is small.

Example 2

Figure 3:
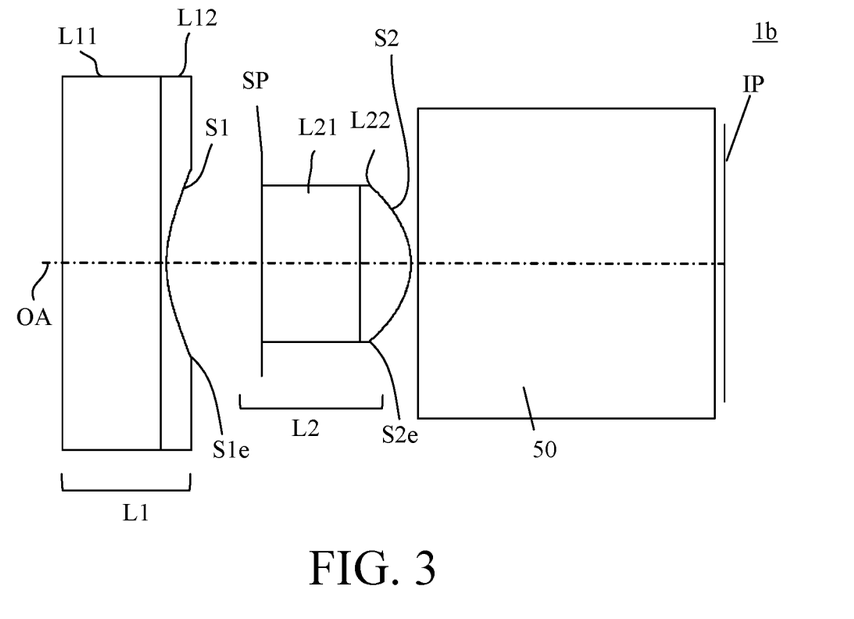
FIG. 3 is a sectional view of an optical system according to Example 2.
Figure 4:
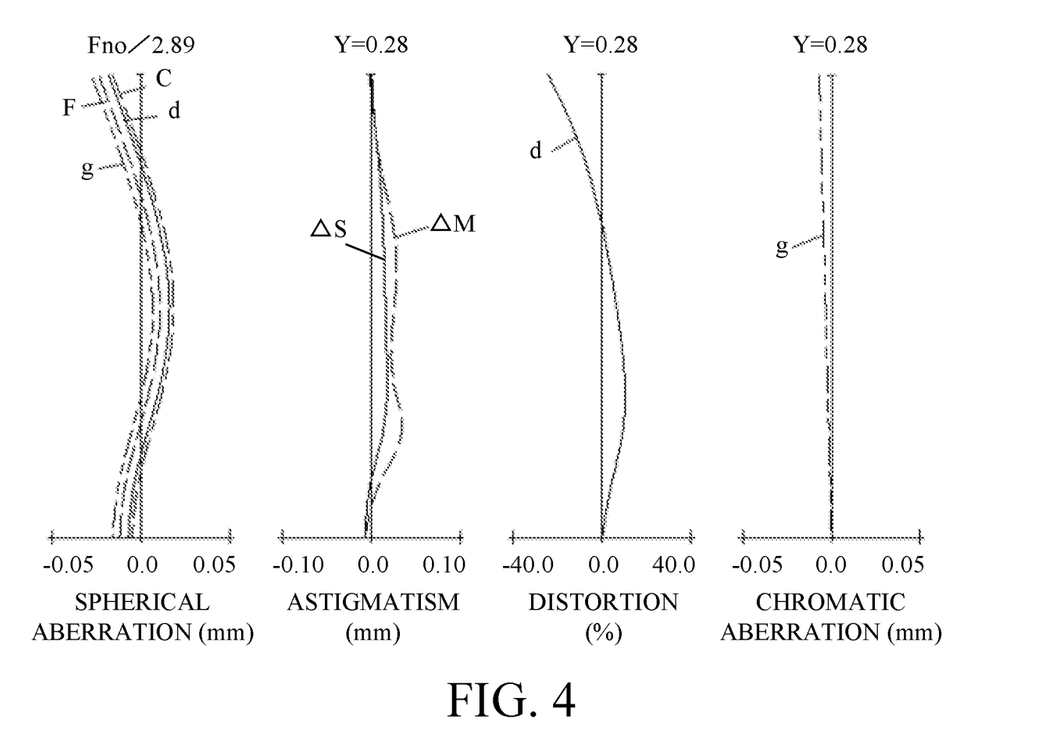
FIG. 4 is an aberration diagram of the optical system according to Example 2.

Referring now to FIG. 3, a description will be given of an optical system 1b according to Example 2 (numerical example 2). The basic configuration of the optical system 1b according to this example is the same as that of the optical system 1a according to Example 1. In the optical system 1b according to this example, the thickness of the first substrate L11 of the first unit L1 (thickness in the optical axis direction), the thickness of the second substrate L21 of the second unit L2, and thickness of the cover glass 50 are larger than those of the optical system 1a according to Example 1. The optical system 1b according to this example has a configuration that is easy to manufacture because cracks and deformations during feeding are unlikely to occur in the wafer process. The optical system 1b according to this example is a compact yet bright and wide-angle optical system having a half angle of view of 59°, an F-number of 2.9, and an image height of 0.28 mm. As illustrated in FIG. 4, the optical system 1b according to this example satisfactorily corrects various aberrations from the on-axis luminous flux to the off-axis luminous flux, even though the optical system is small, bright, and wide-angle.

Example 3

Figure 5:
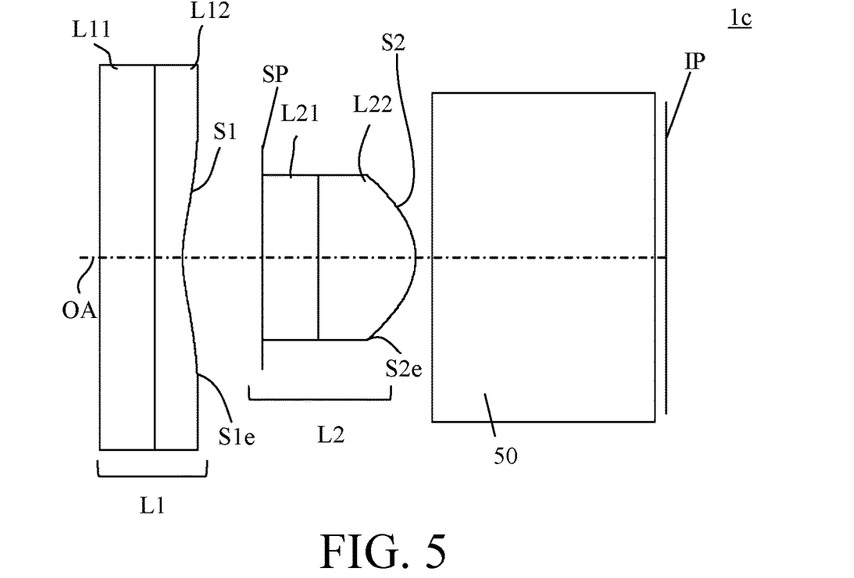
FIG. 5 is a sectional view of an optical system according to Example 3.
Figure 6:
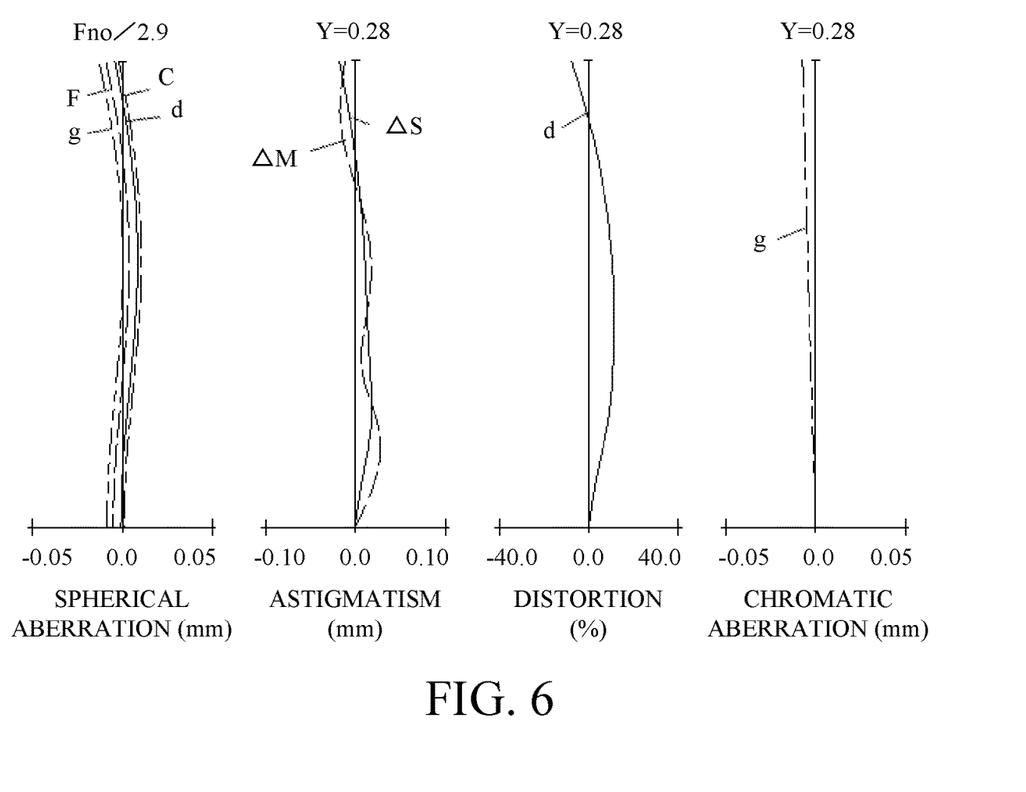
FIG. 6 is an aberration diagram of the optical system according to Example 3.

Referring now to FIG. 5, a description will be given of an optical system 1c according to Example 3 (numerical example 3). The basic configuration of the optical system 1c according to this example is the same as that of the optical system 1a according to Example 1. In the optical system 1c according to this example, a minimum thickness (thickness in the optical axis direction) of the first lens L12 is larger than that of the optical system 1a according to Example 1. Therefore, in the wafer process, resin molding is satisfactorily stable and the structure is easy to manufacture. The optical system 1c according to this example is a compact yet bright and wide-angle optical system having a half angle of view of 59°, an F-number of 2.9, and an image height of 0.28 mm. As illustrated in FIG. 6, the optical system 1c according to this example satisfactorily corrects various aberrations from the on-axis luminous flux to the off-axis luminous flux, even though the optical system is small, bright, and wide-angle.

Example 4

Figure 7:
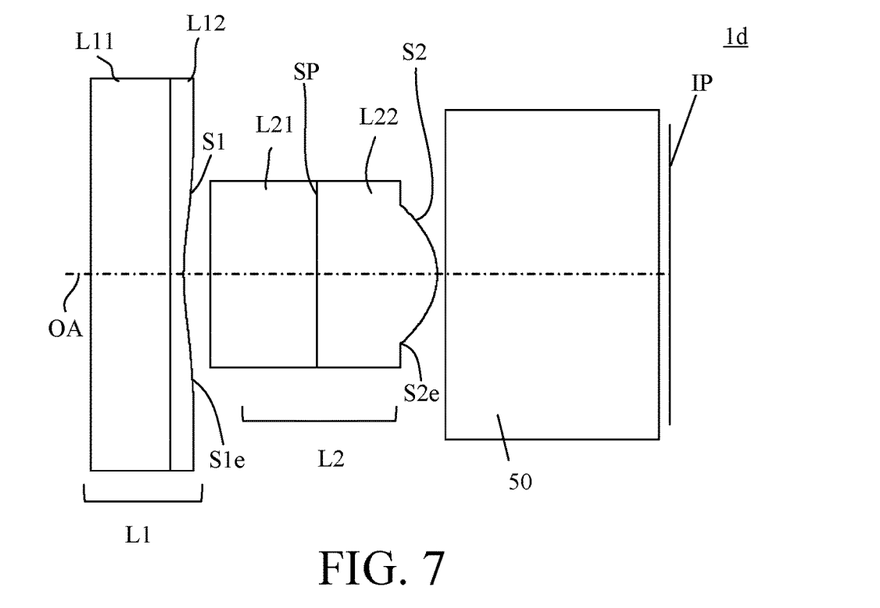
FIG. 7 is a sectional view of an optical system according to Example 4.
Figure 8:
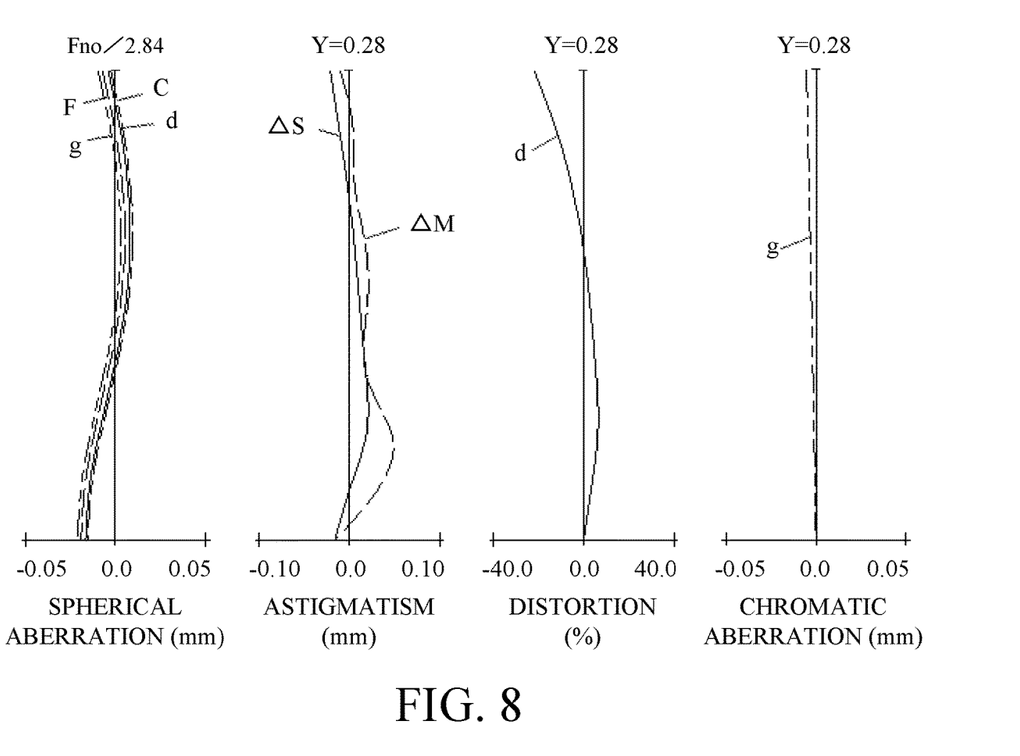
FIG. 8 is an aberration diagram of the optical system according to Example 4.

Referring now to FIG. 7, a description will be given of an optical system 1d according to Example 4 (numerical example 4). In the optical system 1d according to this example, a diaphragm SP of the second unit L2 is disposed on the image side of the second substrate L21 of the second unit L2. The optical system 1d according to this example is a compact yet bright and wide-angle optical system having a half angle of view of 59°, an F-number of 2.8, and an image height of 0.28 mm. As illustrated in FIG. 8, the optical system 1d according to this example satisfactorily corrects various aberrations from the on-axis luminous flux to the off-axis luminous flux, even though the optical system is small, bright, and wide-angle.

Example 5

Figure 9:
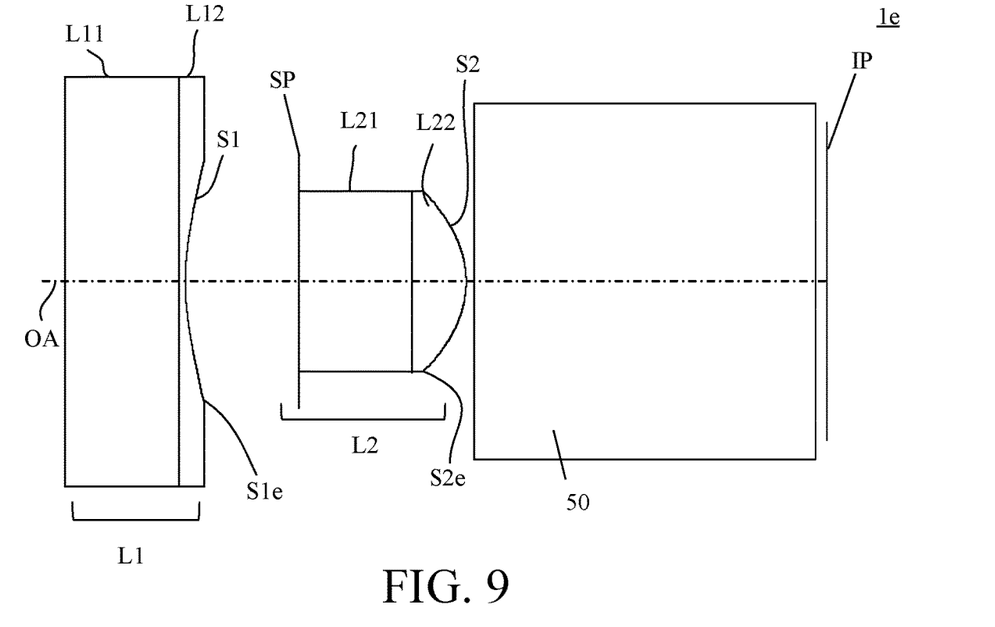
FIG. 9 is a sectional view of an optical system according to Example 5.
Figure 10:
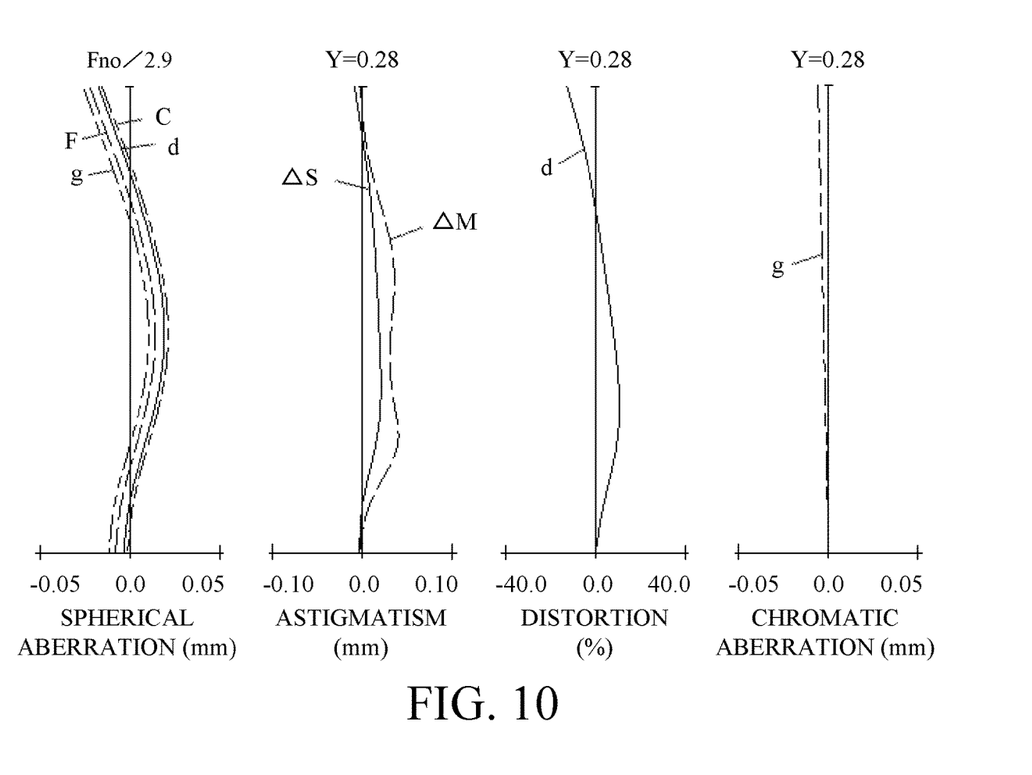
FIG. 10 is an aberration diagram of the optical system according to Example 5.

Referring now to FIG. 9, a description will be given of an optical system 1e according to Example 5 (numerical example 5). The basic configuration of the optical system 1e according to this example is the same as that of the optical system 1a according to Example 1. The optical system 1e according to this example is a compact yet bright and wide-angle optical system having a half angle of view of 50°, an F-number of 2.9, and an image height of 0.28 mm. As illustrated in FIG. 10, the optical system 1e according to this example satisfactorily corrects various aberrations from the on-axis luminous flux to the off-axis luminous flux, even though the optical system is small, bright, and wide-angle.

Example 6

Figure 11:
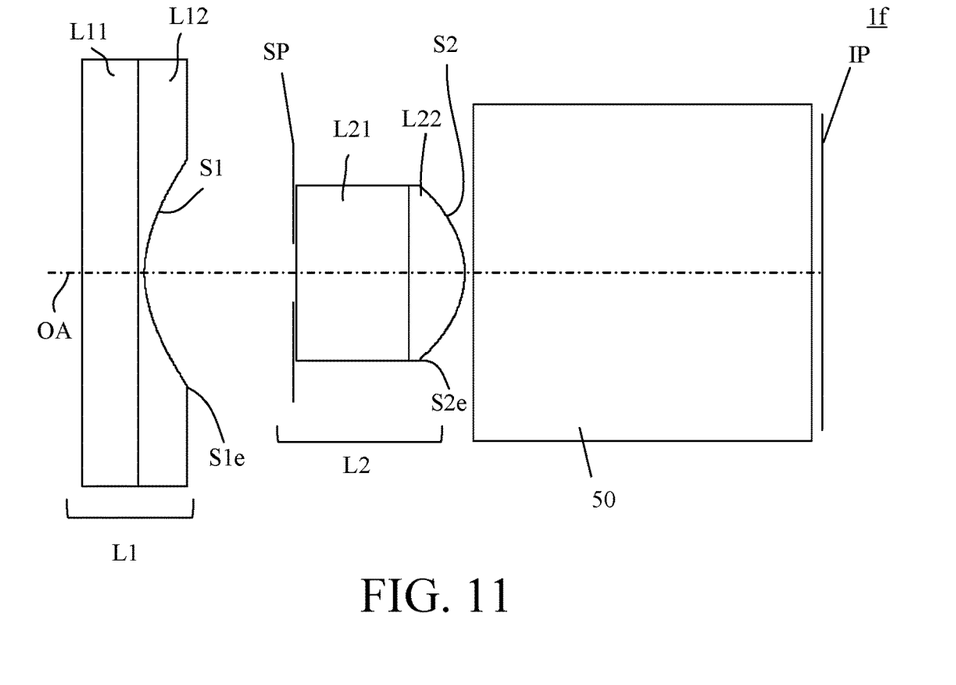
FIG. 11 is a sectional view of an optical system according to Example 6.
Figure 12:
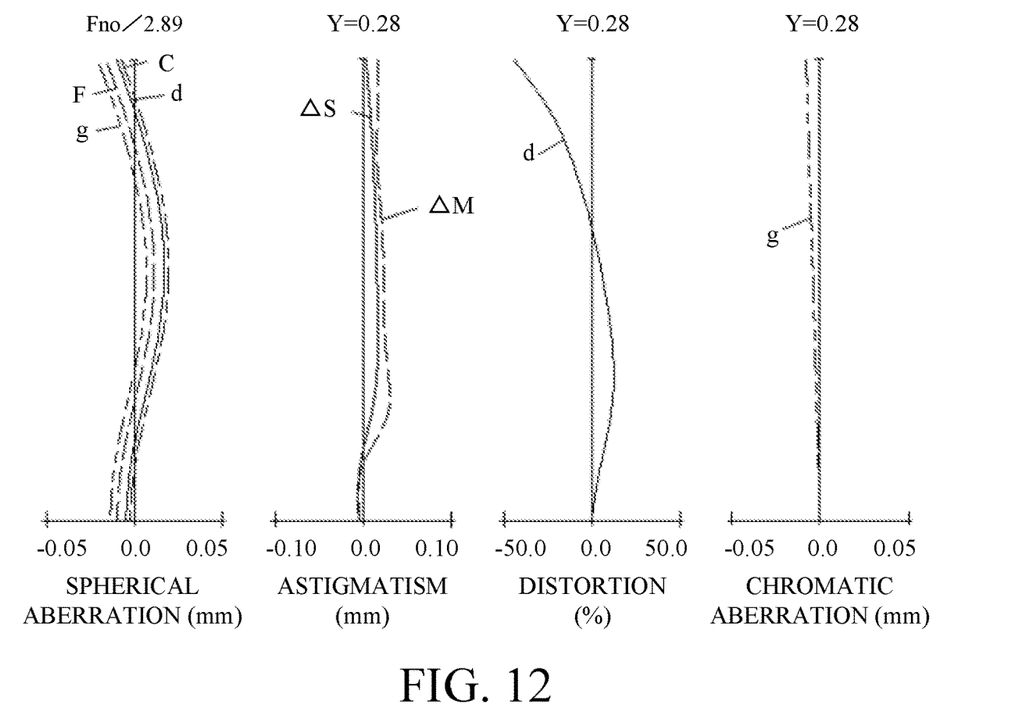
FIG. 12 is an aberration diagram of the optical system according to Example 6.

Referring now to FIG. 11, a description will be given of an optical system 1f according to Example 6 (numerical example 6). The basic configuration of the optical system 1f according to this example is the same as that of the optical system 1a according to Example 1. The optical system 1f according to this example is a compact yet bright and wide-angle optical system having a half angle of view of 70°, an F-number of 2.9, and an image height of 0.28 mm. As illustrated in FIG. 12, the optical system 1f according to this example satisfactorily corrects various aberrations from the on-axis luminous flux to the off-axis luminous flux even though the optical system is small, bright, and wide-angle.

Example 7

Figure 13:
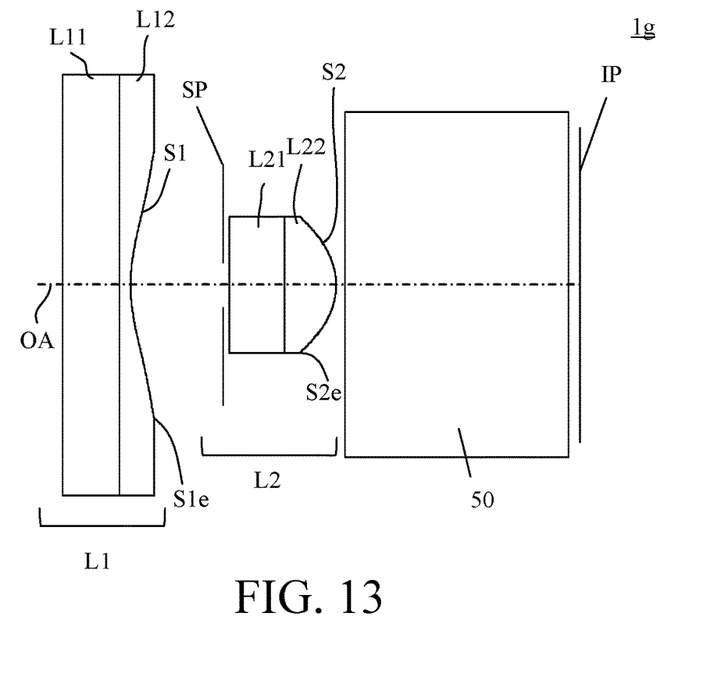
FIG. 13 is a sectional view of an optical system according to Example 7.
Figure 14:
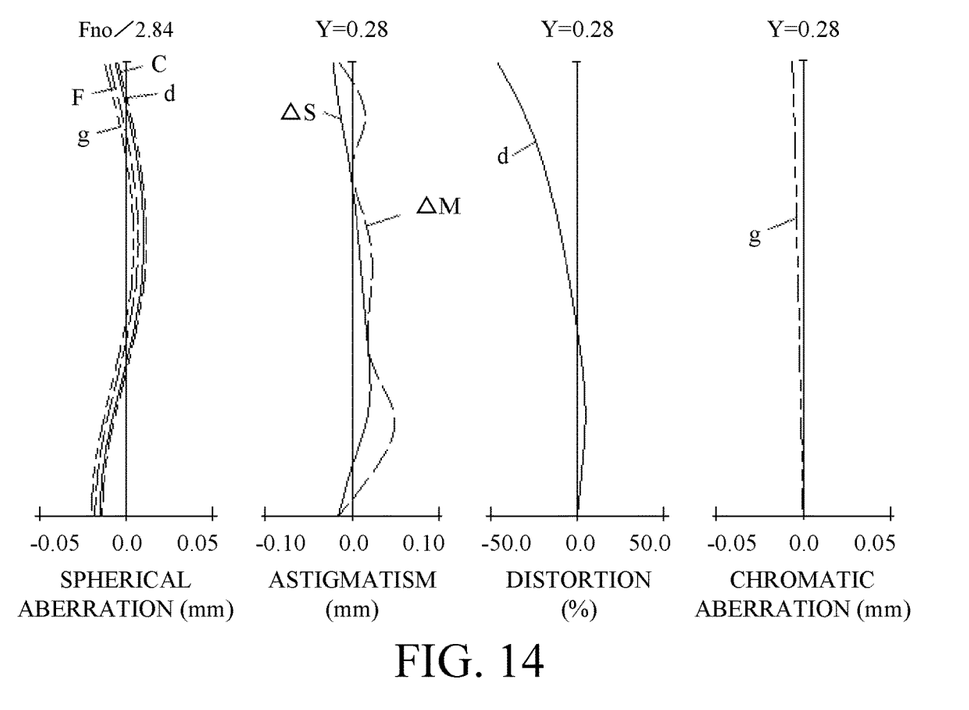
FIG. 14 is an aberration diagram of the optical system according to Example 7.

Referring now to FIG. 13, a description will be given of an optical system 1g according to Example 7 (numerical example 7). The basic configuration of the optical system 1g according to this example is the same as that of the optical system 1a according to Example 1. The optical system 1g according to this example is a compact yet bright and wide-angle optical system having a half angle of view of 70°, an F-number of 2.8, and an image height of 0.28 mm. As illustrated in FIG. 14, the optical system 1g according to this example satisfactorily corrects various aberrations from the on-axis luminous flux to the off-axis luminous flux even though the optical system is small, bright, and wide-angle.

A description will now be given of numerical examples 1 to 7 corresponding to Examples 1 to 7. In each numerical example, m denotes the number of a surface or optical element counted from the light incident side. For example, Rm denotes a radius of curvature (mm) of an m-th optical surface (m-th surface). Dm denotes an on-axis distance (mm) between an m-th surface and an (m+1)-th surface. Nd is a refractive index of a material of an optical element for the d-line. νd is an Abbe number based on the d-line of a material of an optical element. "E±XX" means "$\times 10^{\pm XX}$". f denotes a focal length, and Fno denotes an effective F-number. ω denotes a half angle of view (degrees). BF denotes a backfocus, which is a distance from the final surface of the optical system to the image plane.

Numerical Example 1 f = 0.209  Fno = 2.84  2ω = 118°

| Surface No. | R | D | Nd | vd | Effective diameter |
|---|---|---|---|---|---|
| 1 | ∞ | 0.100 | 1.5168 | 64.2 | 0.60 |
| 2 | ∞ | 0.030 | 1.5100 | 57.5 | 0.46 |
| 3 (aspheric) | 0.3592 | 0.149 | | | 0.39 |
| 4 (Diaphragm) | ∞ | 0.000 | | | 0.09 |
| 5 | ∞ | 0.100 | 1.5168 | 64.2 | 0.18 |
| 6 | ∞ | 0.160 | 1.5100 | 57.5 | 0.18 |
| 7 (aspheric) | −0.1199 | 0.030 | | | 0.28 |
| 8 | ∞ | 0.400 | 1.5168 | 64.2 | 0.36 |
| 9 | ∞ | | | | 0.57 |
| BF = 0.02 | | | | | |

ASPHERIC COEFFICIENT

| | 3rd Surface | 7th Surface |
|---|---|---|
| K | −8.17811E+00 | −9.10764E+00 |
| A4 | −2.48232E+01 | −3.58329E+02 |
| A6 | 4.32682E+02 | 3.50904E+04 |
| A8 | 7.37237E+03 | −2.23556E+06 |
| A10 | −4.16420E+05 | 7.54984E+07 |
| A12 | 4.63866E+06 | −1.02744E+09 |

Numerical Example 2 f = 0.222  Fno = 2.89  2ω = 118°

| Surface No. | R | D | Nd | vd | Effective diameter |
|---|---|---|---|---|---|
| 1 | ∞ | 0.200 | 1.5168 | 64.2 | 0.70 |
| 2 | ∞ | 0.011 | 1.5100 | 57.5 | 0.43 |
| 3 (aspheric) | 0.2255 | 0.193 | | | 0.35 |
| 4 (Diaphragm) | ∞ | 0.000 | | | 0.10 |
| 5 | ∞ | 0.200 | 1.5168 | 64.2 | 0.10 |
| 6 | ∞ | 0.103 | 1.5300 | 56.0 | 0.29 |
| 7 (aspheric) | −0.1478 | 0.015 | | | 0.31 |
| 8 | ∞ | 0.600 | 1.5168 | 64.2 | 0.36 |
| 9 | ∞ | | | | 0.58 |
| BF = 0.02 | | | | | |

ASPHERIC COEFFICIENT

| | 3rd Surface | 7th Surface |
|---|---|---|
| K | −3.66634E+01 | −1.10654E+01 |
| A4 | 1.09167E+02 | −2.29816E+02 |
| A6 | −8.23526E+03 | 1.79179E+04 |
| A8 | 3.42649E+05 | −9.56015E+05 |
| A10 | −7.57580E+06 | 2.76785E+07 |
| A12 | 6.83791E+07 | −3.27104E+08 |

Numerical Example 3 f = 0.183  Fno = 2.9  2ω = 118°

| Surface No. | R | D | Nd | vd | Effective diameter |
|---|---|---|---|---|---|
| 1 | ∞ | 0.100 | 1.5168 | 64.2 | 0.64 |
| 2 | ∞ | 0.050 | 1.5200 | 47.0 | 0.50 |
| 3 (aspheric) | 0.2439 | 0.144 | | | 0.40 |
| 4 (Diaphragm) | ∞ | 0.000 | | | 0.08 |
| 5 | ∞ | 0.100 | 1.5168 | 64.2 | 0.08 |
| 6 | ∞ | 0.175 | 1.5200 | 47.0 | 0.20 |
| 7 (aspheric) | −0.1158 | 0.030 | | | 0.30 |
| 8 | ∞ | 0.400 | 1.5168 | 64.2 | 0.38 |
| 9 | ∞ | | | | 0.55 |
| BF = 0.02 | | | | | |

ASPHERIC COEFFICIENT

| | 3rd Surface | 7th Surface |
|---|---|---|
| K | −1.88497E+01 | −6.73952E+00 |
| A4 | −4.96067E+00 | −2.86470E+02 |
| A6 | −4.54092E+02 | 2.34926E+04 |
| A8 | 2.32049E+04 | −1.28204E+06 |
| A10 | −4.38925E+05 | 3.83506E+07 |
| A12 | 3.06454E+06 | −4.68543E+08 |

Numerical Example 4 f = 0.211  Fno = 2.84  2ω = 118°

| Surface No. | R | D | Nd | vd | Effective diameter |
|---|---|---|---|---|---|
| 1 | ∞ | 0.150 | 1.5168 | 64.2 | 0.68 |
| 2 | ∞ | 0.025 | 1.5100 | 57.5 | 0.47 |
| 3 (aspheric) | 0.5339 | 0.050 | | | 0.42 |
| 4 | ∞ | 0.200 | 1.5168 | 64.2 | 0.32 |
| 5 (Diaphragm) | ∞ | 0.226 | 1.5100 | 57.5 | 0.09 |
| 6 (aspheric) | −0.1180 | 0.015 | | | 0.26 |
| 7 | ∞ | 0.400 | 1.5168 | 64.2 | 0.33 |
| 8 | ∞ | | | | 0.57 |
| BF = 0.02 | | | | | |

ASPHERIC COEFFICIENT

| | 3rd Surface | 6th Surface |
|---|---|---|
| K | 2.45135E−01 | −1.28390E+01 |
| A4 | −1.95476E+01 | −4.40719E+02 |
| A6 | −1.87107E+02 | 5.05215E+04 |
| A8 | 2.19302E+04 | −3.75675E+06 |
| A10 | −5.09987E+05 | 1.48835E+08 |
| A12 | 4.02848E+06 | −2.39036E+09 |

Numerical Example 5 f = 0.268  Fno = 2.9  2ω = 100°

| Surface No. | R | D | Nd | vd | Effective diameter |
|---|---|---|---|---|---|
| 1 | ∞ | 0.200 | 1.5168 | 64.2 | 0.67 |
| 2 | ∞ | 0.011 | 1.5310 | 55.7 | 0.43 |
| 3 (aspheric) | 0.3687 | 0.200 | | | 0.39 |
| 4 (Diaphragm) | ∞ | 0.000 | | | 0.11 |
| 5 | ∞ | 0.200 | 1.5168 | 64.2 | 0.11 |
| 6 | ∞ | 0.095 | 1.5310 | 55.7 | 0.30 |
| 7 (aspheric) | −0.1609 | 0.015 | | 0.0 | 0.32 |
| 8 | ∞ | 0.600 | 1.5168 | 64.2 | 0.36 |
| 9 | ∞ | | | | 0.58 |
| BF = 0.02 | | | | | |

ASPHERIC COEFFICIENT

| | 3rd Surface | 7th Surface |
|---|---|---|
| K | −1.33499E+02 | −1.49030E+01 |
| A4 | 6.35073E+01 | −2.23781E+02 |
| A6 | −4.34973E+03 | 1.80786E+04 |

-continued

| | | |
|---|---|---|
| A8 | 1.54981E+05 | −9.75225E+05 |
| A10 | −2.86138E+06 | 2.82757E+07 |
| A12 | 2.13758E+07 | −3.32787E+08 |

Numerical Example 6 f = 0.184  Fno = 2.89  2ω = 140°

| Surface No. | R | D | Nd | vd | Effective diameter |
|---|---|---|---|---|---|
| 1 | ∞ | 0.100 | 1.5168 | 64.2 | 0.70 |
| 2 | ∞ | 0.011 | 1.5100 | 57.5 | 0.54 |
| 3 (aspheric) | 0.1839 | 0.264 | | | 0.40 |
| 4 (Diaphragm) | ∞ | 0.005 | | | 0.11 |
| 5 | ∞ | 0.200 | 1.5168 | 64.2 | 0.11 |
| 6 | ∞ | 0.099 | 1.5300 | 56.0 | 0.29 |
| 7 (aspheric) | −0.1481 | 0.015 | | | 0.31 |
| 8 | ∞ | 0.600 | 1.5168 | 64.2 | 0.35 |
| 9 | ∞ | | | | 0.55 |
| BF = 0.02 | | | | | |

ASPHERIC COEFFICIENT

| | 3rd Surface | 7th Surface |
|---|---|---|
| K | −1.39743E+01 | −8.78131E+00 |
| A4 | 6.66364E+01 | −1.85785E+02 |
| A6 | −2.34970E+03 | 1.20004E+04 |
| A8 | 4.16853E+04 | −5.58397E+05 |
| A10 | −3.11553E+05 | 1.45240E+07 |
| A12 | 1.89095E+05 | −1.57007E+08 |

Numerical Example 7 f = 0.186  Fno = 2.89  2ω = 140°

| Surface No. | R | D | Nd | vd | Effective diameter |
|---|---|---|---|---|---|
| 1 | ∞ | 0.100 | 1.5168 | 64.2 | 0.69 |
| 2 | ∞ | 0.020 | 1.5100 | 57.5 | 0.54 |
| 3 (aspheric) | 0.3070 | 0.166 | | | 0.44 |
| 4 (Diaphragm) | ∞ | 0.010 | | | 0.08 |
| 5 | ∞ | 0.100 | 1.5168 | 64.2 | 0.08 |
| 6 | ∞ | 0.091 | 1.5100 | 57.5 | 0.21 |
| 7 (aspheric) | −0.1090 | 0.015 | | | 0.24 |
| 8 | ∞ | 0.399 | 1.5168 | 64.2 | 0.32 |
| 9 | ∞ | | | | 0.57 |
| BF = 0.02 | | | | | |

ASPHERIC COEFFICIENT

| | 3rd Surface | 7th Surface |
|---|---|---|
| K | −1.62113E+01 | −1.22192E+01 |
| A4 | 3.44701E+01 | −5.53837E+02 |
| A6 | −2.60774E+03 | 7.11976E+04 |
| A8 | 8.06761E+04 | −5.89167E+06 |
| A10 | −1.19531E+06 | 2.63097E+08 |
| A12 | 6.91564E+06 | −4.81501E+09 |

Table 1 shows a relationship between the numerical values regarding the above inequalities (1) to (11) and the numerical examples.

TABLE 1

| | Numerical Example | | | | | | |
|---|---|---|---|---|---|---|---|
| Inequality | 1 | 2 | 3 | 4 | 5 | 6 | 7 |
| P1 | −1.420 | −2.262 | −2.132 | −0.955 | −1.440 | −2.774 | −1.661 |
| P2 | 4.254 | 3.587 | 4.492 | 4.324 | 3.299 | 3.578 | 4.680 |
| P2/P1 | −2.996 | −1.586 | −2.107 | −4.527 | −2.291 | −1.290 | −2.817 |
| R1e | 1.935 | 0.493 | 2.548 | 3.780 | 0.929 | 0.390 | 1.357 |
| R1/R1e | 5.385 | 2.187 | 10.447 | 7.079 | 2.520 | 2.119 | 4.420 |
| R2e | −0.183 | −0.208 | −0.193 | −0.175 | −0.218 | −0.208 | −0.163 |
| R2/R2e | 1.522 | 1.406 | 1.671 | 1.482 | 1.355 | 1.407 | 1.498 |
| d1 | 0.149 | 0.193 | 0.144 | 0.250 | 0.200 | 0.264 | 0.166 |
| R1e/d1 | 12.983 | 2.561 | 17.685 | 15.149 | 4.648 | 1.478 | 8.155 |
| d0 | 0.279 | 0.403 | 0.294 | 0.425 | 0.411 | 0.374 | 0.286 |
| d0/R1 | 0.777 | 1.788 | 1.206 | 0.795 | 1.114 | 2.036 | 0.933 |
| N1 | 1.510 | 1.510 | 1.520 | 1.510 | 1.531 | 1.510 | 1.510 |
| ν1 | 57.5 | 57.5 | 47.0 | 57.5 | 55.7 | 57.5 | 57.5 |
| N2 | 1.510 | 1.530 | 1.520 | 1.510 | 1.531 | 1.530 | 1.510 |
| ν2 | 57.5 | 56.0 | 47.0 | 57.5 | 55.7 | 56.0 | 57.5 |
| |ν1 − ν2| | 0.0 | 1.5 | 0.0 | 0.0 | 0.0 | 1.5 | 0.0 |

While the imaging optical system has been described in Examples 1 to 7, the optical system according to each example is suitably used for a built-in camera of an electronic apparatus such as a mobile phone, a smartphone, and a wearable terminal, an objective optical system of an endoscope, and the like.

Example 8

Referring now to FIG. 15, a description will be given of an electronic apparatus according to Example 8 of the present invention. FIG. 15 is a schematic view of principal part of the electronic apparatus (smartphone 70) according to this example. The smartphone 70 includes an image pickup apparatus 71 as a front camera module. The image pickup apparatus 71 includes an optical system 72 corresponding to any of the optical systems according to Examples 1 to 7, and an image sensor 73 that receives an image formed by the optical system 72. Thus, by applying the optical system according to each of the above examples to an image pickup apparatus such as a smartphone, a compact image pickup apparatus having high optical performance can be realized.

Example 9

Referring now to FIG. 16, a description will be given of an image pickup apparatus according to Example 9 of the present invention. FIG. 16 is a schematic view of principal part of the image pickup apparatus 100 according to this example. The image pickup apparatus 100 is used for a small endoscope and includes a camera head 120 and an electric cable 150. The camera head 120 includes a lens housing 121 including an optical system according to any one according to Examples 1 to 7, an image sensor 122, and a ceramic substrate 123. Wires of the electric cable 150 are connected to the image sensor 122 via the ceramic substrate 123. Thus, by applying the optical system according to each of the above examples to the image pickup apparatus of the endoscope, a compact image pickup apparatus having high optical performance can be realized.

Each of the above examples can provide a compact wide-angle optical system having high optical performance and an image pickup apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-003688, filed on Jan. 13, 2021, which is hereby incorporated by reference herein in its entirety.

What is claimed is:

1. An optical system comprising: a first unit,
a second unit disposed on an image side of the first unit, and
a diaphragm disposed on the image side of the first unit,
wherein the first unit includes a first substrate, and a first lens having a negative refractive power and disposed on the image side of the first substrate,
wherein the second unit includes a second substrate, and a second lens having a positive refractive power and disposed on the image side of the second substrate,
wherein an absolute value of the refractive power on an optical axis of the second lens is larger than that of the first lens,
wherein an image side surface of the first lens is an aspheric surface,
wherein in the aspheric surface of the first lens, a refractive power at an outermost peripheral portion in an effective area is smaller than a refractive power on the optical axis, and
wherein the following inequality is satisfied:

$$1.00 < R1e/d1 < 30.00$$

where $R1e$ is a radius of a curvature of the outermost peripheral portion in the effective area of the first lens, and $d1$ is a distance on the optical axis from the image side surface of the first lens to the diaphragm.

2. The optical system according to claim 1, wherein the following inequality is satisfied:

$$1.10 < |P2/P1| < 8.00$$

where P1 is the refractive power of the first lens on the optical axis, and P2 is the refractive power of the second lens on the optical axis.

3. The optical system according to claim 1, wherein the following inequality is satisfied:

$$1.50 < |rp1| < 20.00$$

where $rp1$ is a refractive power ratio on the optical axis to the outermost peripheral portion in the effective area of the first lens.

4. The optical system according to claim 1, wherein an image side surface of the second lens is an aspheric surface, and
wherein in the aspherical surface of the second lens, a refractive power at an outermost peripheral portion in an effective area is smaller than a refractive power on the optical axis.

5. The optical system according to claim 1, wherein the following inequality is satisfied:

$$1.25 < |rp2| < 10.00$$

where $rp2$ is a refractive power ratio on the optical axis to the outermost peripheral portion in the effective area of the second lens.

6. The optical system according to claim 1, wherein the diaphragm is disposed on the second substrate.

7. The optical system according to claim 1, wherein the following inequality is satisfied:

$$0.53 < d0/R1 < 5.00$$

where $d0$ is a distance on the optical axis from an object side surface of the first unit to the diaphragm, and R1 is a radius of curvature on the optical axis of the first lens.

8. The optical system according to claim 1, wherein the following inequality is satisfied:

$$1.40 < N1 < 1.65$$

where N1 is a refractive index of the first lens for d-line.

9. The optical system according to claim 1, wherein the following inequality is satisfied:

$$1.40 < N2 < 1.65$$

where N2 is a refractive index of the second lens for d-line.

10. The optical system according to claim 1, wherein the following inequality is satisfied:

$$40 < v1 < 80$$

where $v1$ is an Abbe number of the first lens based on d-line.

11. The optical system according to claim 1, wherein the following inequality is satisfied:

$$40 < v2 < 80$$

where ν2 is an Abbe number of the second lens based on d-line.

12. The optical system according to claim 1, wherein refractive indexes of the first substrate and the first lens are different from each other.

13. The optical system according to claim 1, wherein refractive indexes of the second substrate and the second lens are different from each other.

14. The optical system according to claim 1, wherein the first substrate is a flat substrate, the first lens is a plano-concave lens, and the first lens is disposed in close contact with the first substrate, and
wherein the second substrate is a flat substrate, the second lens is a plano-convex lens, and the second lens is disposed in close contact with the second substrate.

15. An image pickup apparatus comprising:
an optical system according to claim 1; and
an image sensor configured to receive an image formed by the optical system,
wherein the optical system includes, in order from an object side to an image side, a first unit and a second unit.

16. An optical system comprising:
a first unit,
a second unit disposed on an image side of the first unit, and
diaphragm disposed on the image side of the first unit,
wherein the first unit includes a first substrate, and a first lens having a negative refractive power and disposed on the image side of the first substrate,
wherein the second unit includes a second substrate, and a second lens having a positive refractive power and disposed on the image side of the second substrate,
wherein an absolute value of the refractive power on an optical axis of the second lens is larger than that of the first lens,
wherein an image side surface of the first lens is an aspheric surface,
wherein in the aspheric surface of the first lens, a refractive power at an outermost peripheral portion in an effective area is smaller than a refractive power on the optical axis, and
wherein the following inequality is satisfied:

$$0.53 < d0/R1 < 5.00 \qquad (6)$$

where d0 is a distance on the optical axis from an object side surface of the first unit to the diaphragm, and R1 is a radius of curvature on the optical axis of the first lens.

17. An image pickup apparatus comprising:
an optical system according to claim 16; and
an image sensor configured to receive an image formed by the optical system.

* * * * *